Sept. 5, 1939.　　　　W. D. LOY　　　　2,172,287
OPTICAL DEVICE
Filed Oct. 14, 1938
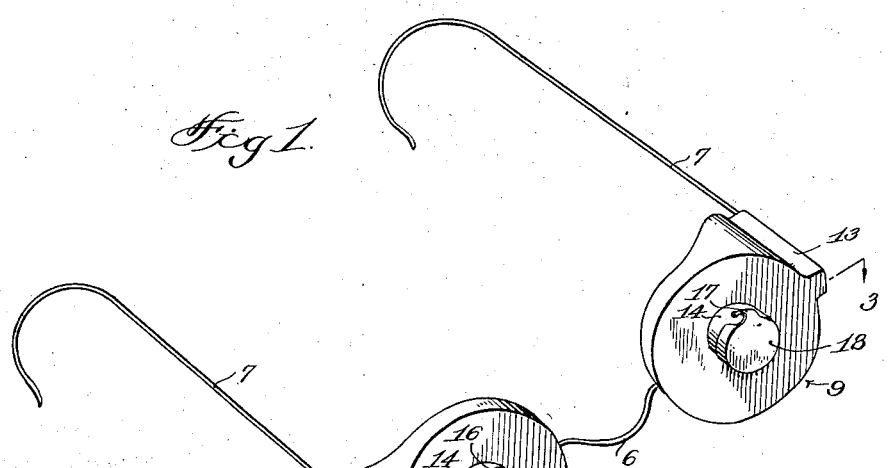
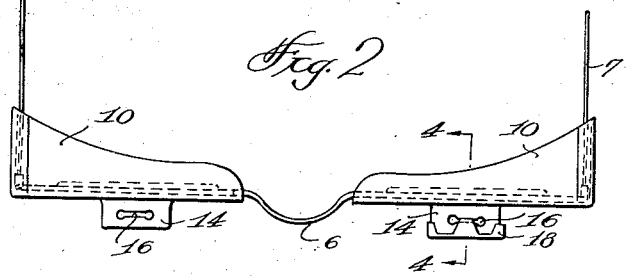
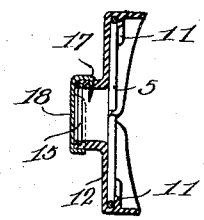
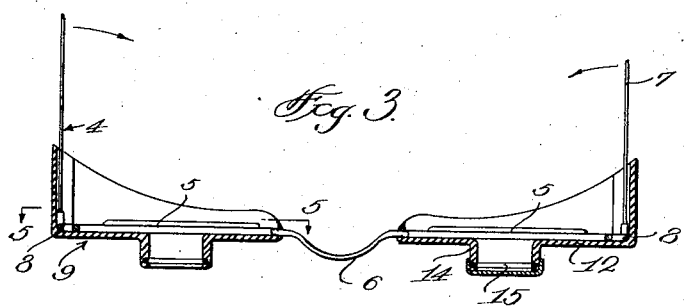
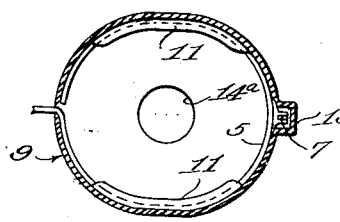
Wong Do Loy
INVENTOR
BY *Victor J. Evans & Co.*
ATTORNEYS Patented Sept. 5, 1939

2,172,287

UNITED STATES PATENT OFFICE 2,172,287

OPTICAL DEVICE

Wong Do Loy, Washington, D. C.

Application October 14, 1938, Serial No. 235,034

4 Claims. (Cl. 2—14)

My invention relates to optical devices, and has as one of the principal objects thereof the provision of such a device adapted to be secured over the rims of spectacle frames or the like and which is so constructed and arranged as to preclude glare from the sun or reflection from immediate objects or surfaces being projected onto the retinas of the eyes together with means for enabling desired objects to be readily sighted and/or focused, for instance, firearms, telescopes, microscopes, cameras and the like, and which require the use of one of the eyes only.

Another object of my invention is to provide a device of the character described equipped with sight openings capable of being selectively opened and closed to permit the sighting therethrough of a desired object by the use of one eye without the necessity of closing the other eye.

A further object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a perspective view of my invention.

Figure 2 is a top plan view thereof.

Figure 3 is a sectional view taken on the line 3—3 of Figure 1.

Figure 4 is a detailed sectional view taken on the line 4—4 of Figure 2.

Figure 5 is a detailed sectional view taken on the line 5—5 of Figure 3.

In practicing my invention, I provide a pair of spectacles 4 fashioned with spaced circular rim members 5 defining eye openings and which are connected together in spaced relation by a nose bridge 6. The rim members 5 are equipped with temple bars 7 pivoted thereto as at 8 and on the outer sides of the respective members 5.

Each of the rim members 5 have attached thereto hoods 9 and inasmuch as each of said hoods are of a like construction, a detailed description of one will suffice, it being understood that the reference characters indicative of parts of one hood are indicative of like parts of the other hood.

The hood 9 comprises a body, preferably constructed of rubber, and similar in shape to the contour of the members 5. The body is fashioned with upper and lower flanges 10 adapted to engage with the face of the wearer and above the eyes. Said flanges 10 are fashioned on their inner faces with ribs 11 coacting with the front opaque wall 12 of the body to secure the hood detachably connected to the respective member 5 as clearly illustrated in Figures 4 and 5 of the drawing. The ends of the flanges, adjacent the temple bar, are integrally connected together and fashioned with an offset section constituting a housing 13 embracing the temple bar and which is formed with an open side permitting said temple bar to be folded inwardly toward the bridge 6 in the usual manner of spectacles.

The front wall 12 is integrally fashioned with a forwardly extending sleeve or scope-piece 14 and which is of tubular configuration having a sight opening 14a therethrough. A relatively stiff ring 15 is mounted in the outer end of the sleeve to maintain the latter in proper form and said sleeve is formed in the upper and outer peripheral face thereof with a slot 16 in which is inserted a hook 17 carried by the upper edge of a disk or shield 18 extending across the front of the sight opening. The hook 17 is readily detachable from the slot 15 to permit removal of the disk or shield whereby a desired object may be sighted through the sight opening 14a of the scope-piece 14 as clearly illustrated in Figure 1 of the drawing.

From the foregoing it will be apparent that I have provided an efficient device whereby a desired object may be clearly sighted by one eye of the user, and so constructed and arranged as to preclude the sighting of the object by the other eye and at the same time shade the eyes from glare.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation which are capable of extended application in advance forms, and that the invention comprehends all construction within the scope of the appended claims.

What I claim is:

1. A pair of hoods adapted to be detachably connected to the rim members defining the eye openings in a spectacle frame of that type having temple bars pivoted to said rim members, said hoods formed with front walls for covering said openings and each of said walls provided with a scope-piece having a sight-opening extending therethrough, each of said walls provided with upper and lower circumferentially and rearwardly extending flanges for engagement with the face about the eyes whereby to preclude light entering said hoods other than through said scope-pieces, said upper and lower flanges having end sections connected together adjacent the respective temple bars and constituting housings for enclosing the ends of the respective temple bars within said hood to permit folding of said temple bars relative to said rim members, and means connected to at least one of said scope pieces for covering the sight opening thereof.

2. As a new article of manufacture, a hood adapted to be detachably connected to a spectacle frame of that type formed with a rim member having pivoted thereto a temple bar, said hood formed with a front wall for covering the eye opening in said rim, said wall provided with a scope-piece having a sight-opening extending therethrough and with upper and lower circumferentially and rearwardly extending flanges for engagement with the face about the eye whereby to preclude light entering said hood other than through said sight-opening, and a rearwardly extending housing connecting said flanges together at one side of said front wall and adapted to receive therein said temple bar.

3. The elements of claim 1 as set forth and defined therein including, said flanges provided with resilient ribs spaced from said front walls and coacting with the latter to detachably clamp said hoods to said members.

4. The elements of claim 2 as set forth and defined therein including, resilient means carried by said flanges and coacting with said front wall to detachably clamp therebetween said rim.

WONG DO LOY.